Sept. 11, 1945.   W. F. BLESI   2,384,527
MACHINE TOOL
Filed June 8, 1944   2 Sheets-Sheet 1

INVENTOR.
Walter F. Blesi
BY Edward J. Noe Jr
ATTORNEY.

Sept. 11, 1945.  W. F. BLESI  2,384,527
MACHINE TOOL
Filed June 8, 1944   2 Sheets-Sheet 2
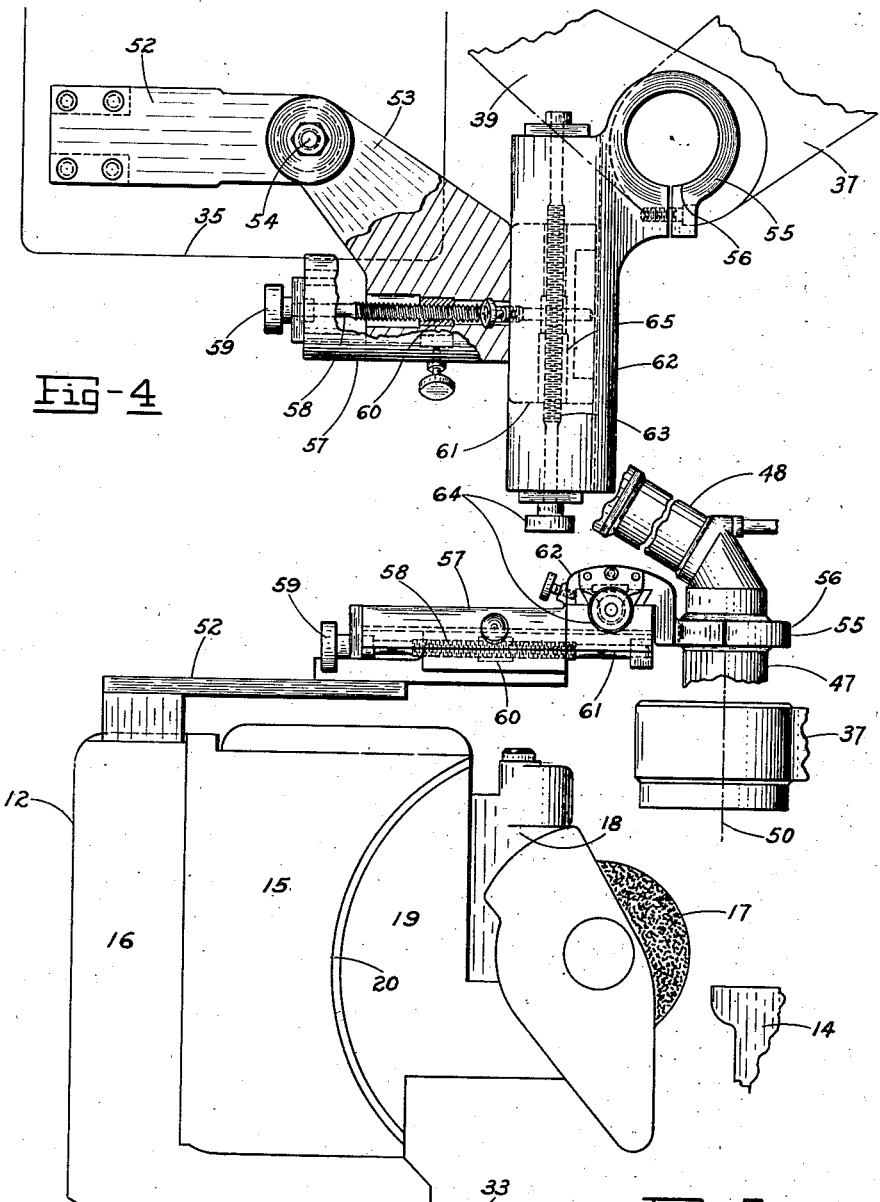
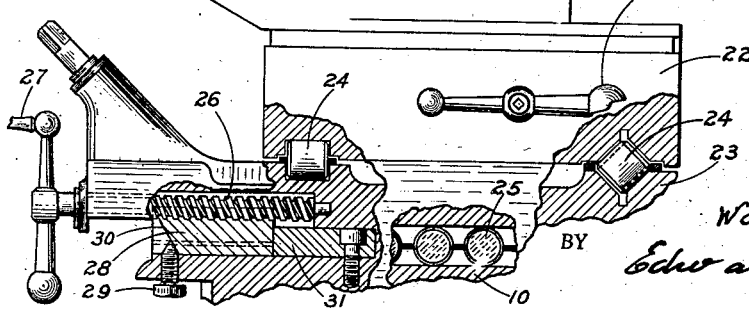
INVENTOR.
Walter F. Blesi
BY Edward J. Noe Jr.
ATTORNEY.

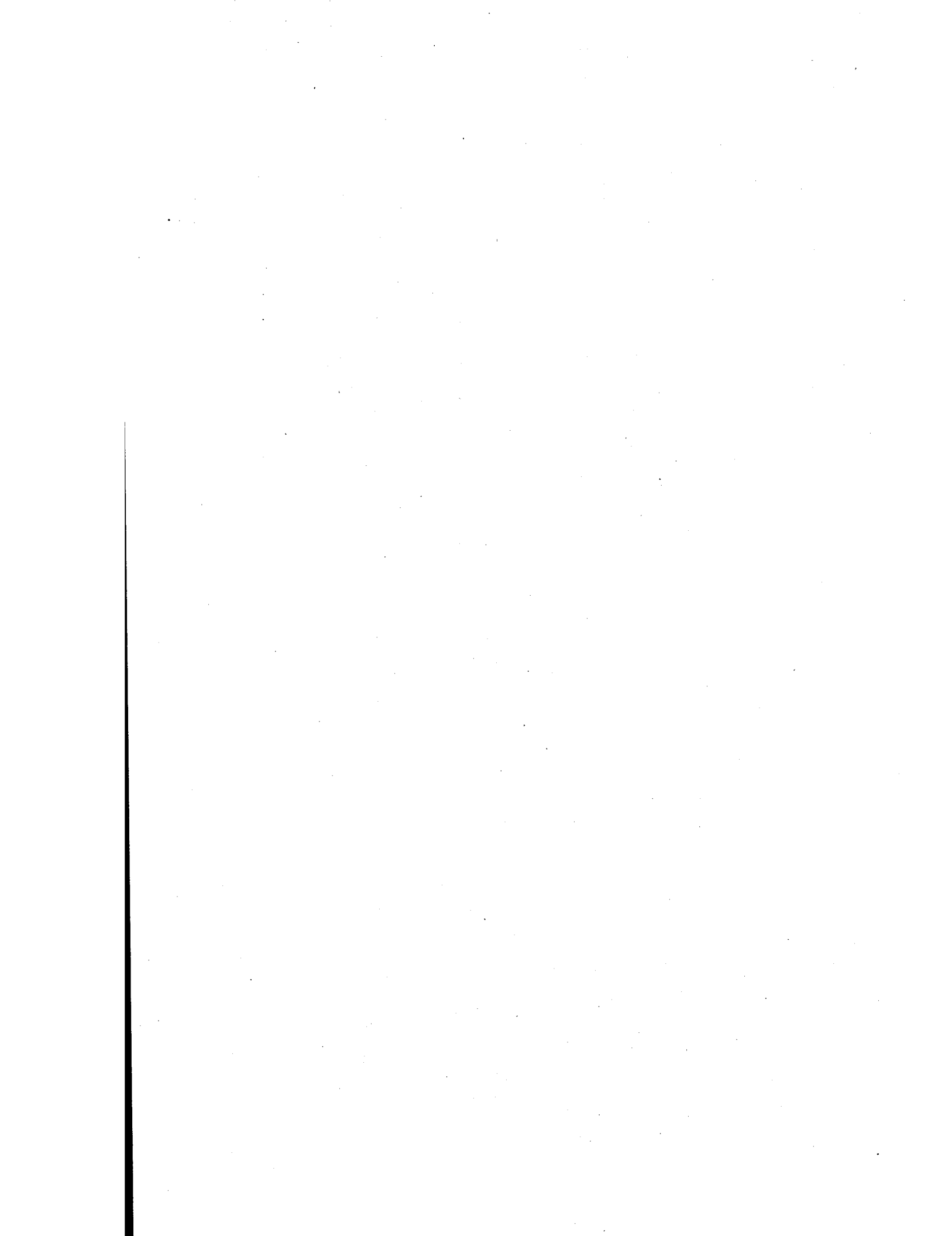

Patented Sept. 11, 1945

2,384,527

UNITED STATES PATENT OFFICE 2,384,527

MACHINE TOOL

Walter F. Blesi, Dayton, Ohio, assignor to The Sheffield Corporation, Dayton, Ohio, a corporation of Ohio Application June 8, 1944, Serial No. 539,354

6 Claims. (Cl. 51—165)

This invention relates to machine tools and more particularly to tools adapted for accurate reproduction of an exact form desired.

One object of this invention is the provision of a machine tool having a work holder on which the work is supported, and a tool holder that carries a suitable tool for cutting or forming the work, these two parts being relatively movable and controlled automatically by a pantograph system. The stylus or follower of the pantograph is operable over a contour or drawing on an enlarged scale while the diminishing point of the pantograph is utilized in producing the relative movement between the tool holder and the work.

Another object is the provision of a machine of the character mentioned in which the movable holder is mounted for free relative movement in two directions with respect to the work holder, and is held against rotational movement.

Another object is the provision of a machine of the character mentioned in which there is provision for positively adjusting the movable holder on the base in the two directions in which it is operable, with means for disabling such positive control means to permit free operation under the control of the pantograph.

Another object is the provision of a grinding machine in which the stylus of the pantograph operates over a drawing support, which, together with the work holder, is relatively stationary with respect to a movable grinding wheel holder, operable automatically under the control of the diminishing point of the pantograph.

Another object is the provision of a machine of the character mentioned having a work viewing means controlled by the diminishing point of the pantograph so that it will be maintained in line with the grinding zone.

Other objects and advantages of the invention will be apparent from the following description, the appended claims, and the accompanying drawings, in which.

Fig. 3 is a side elevation of the machine tool, with portions of the same omitted and with portions shown in vertical section; and Fig. 4 is a top plan view of the connection between the work holder and the tool holder.

Figure 1:
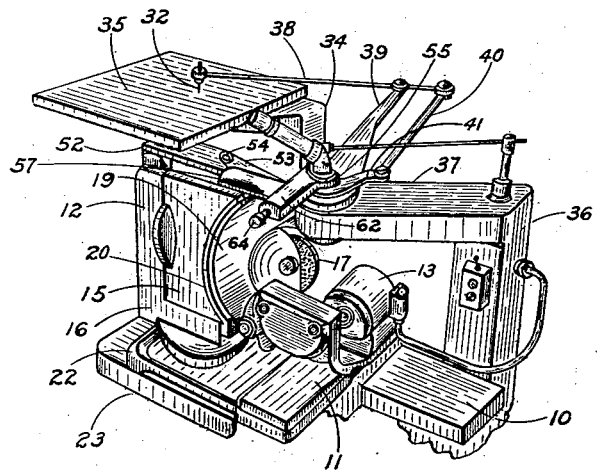
Fig. 1 is a perspective view of a machine tool embodying the present invention.
Figure 2:
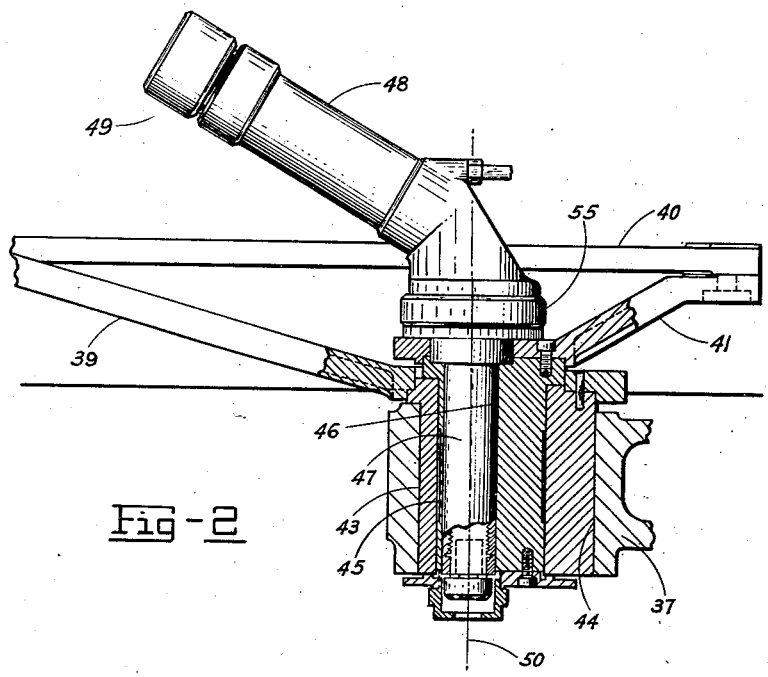
Fig. 2 is a vertical section through the diminishing portion of the pantograph showing its relation to the microscope.

Referring more particularly to the drawings, in which like parts are designated by the same reference numerals in the several views, 10 designates a base, providing the support for a work holder 11 and a cutter holder 12. In the particular form of the invention herein illustrated, it is the work holder which is relatively stationary, while the cutter holder is mounted for freedom of movement in two directions on the base, although it will be understood that the reverse condition may be employed.

The work holder 11 supports a suitable carrier for the workpiece, either a stationary platform 14, see Fig. 3, on which a flat workpiece may be clamped, or, as in the case illustrated in Fig. 1, the work may be mounted for rotation on its own axis between centers, and rotated by a suitable motor 13.

The cutter holder, as will be apparent from Fig. 3, comprises a transmission housing 15 which is adjustably supported on a generally L shaped bracket 16 for adjustment about a horizontal axis perpendicular to the grinding wheel axis. The grinding wheel is illustrated at 17 and is supported on an assembly 18 which is reciprocably operable on a support 19 for vertical movement as viewed in Fig. 3. The support 19 is carried on a part-cylindrical bearing 20 on the transmission housing 15 so that the direction of reciprocatory travel on the grinding wheel can be inclined to any desired extent.

The base portion of the bracket 16 is rotatably mounted for adjustment about a vertical axis on a table 22. The latter is supported for free rectilinear movement on a table 23. As shown, anti-friction bearings 24 are provided between these two tables. The table 23 is supported on the base 10 for rectilinear movement in a direction perpendicular to the movement of table 22 on table 23, anti-friction rollers 25 being interposed between the base and this lower table. Rotatably supported in the table 23 is a threaded shaft 26 operable by a handle 27. Engaging this shaft is a half-nut 28 fixed on base 10. It is held in place by a clamp screw 29 which engages the inclined end 30 of the nut holding the nut in engagement with threaded shaft 26. At its other end, the nut is held in place by a locating block 31 which is fixed to the base, these parts thus holding the half-nut against endwise movement on the base so that as the handle 27 is turned, the table 23 is positively moved along the base to adjust the cutter towards and from the work. This nut 28 may, however, be disabled by removing the locating screw 29 and turning the threaded shaft to withdraw the nut axially towards the left until it is free of the screw and free of the base. When this is done, the table 23 is movable freely on the